United States Patent Office 3,506,394
Patented Apr. 14, 1970

3,506,394
METHOD FOR PRODUCING SODIUM SILICO-FLUORIDE FROM WET PROCESS PHOSPHORIC ACID
Shuta Okamura, Tsunehiko Omoto, Masanao Ezaki, and Yoshiaki Nakamura, Shimonoseki, Japan, assignors to Mitsui Toatsu Chemicals Incorporated, Tokyo, Japan
No Drawing. Filed Dec. 8, 1967, Ser. No. 688,991
Claims priority, application Japan, Feb. 7, 1967, 42/7,446
Int. Cl. C01b 9/08; C01d 3/02; C01f 7/50
U.S. Cl. 23—88    4 Claims

ABSTRACT OF THE DISCLOSURE

A method for producing sodium silicofluoride of a high purity from wet process phosphoric acid comprising reacting a sodium compound with hydrofluosilicic acid contained in wet process phosphoric acid in the presence of sodium fluoride, sodium bifluoride or a mixture thereof.

---

This invention relates to an improved method for producing high quality sodium silicofluoride from wet process phosphoric acid conventionally obtained by treating fluorapatite (which shall be referred to as phosphate rock hereinafter) with sulfuric acid.

In the production of wet process phosphoric acid, a part of the fluorine contained in the raw material phosphate rock volatilizes as hydrogen fluoride and/or silicon tetrafluoride in the acid treating step or remains in gypsum formed by treating the phosphate rock with sulfuric acid. But, more than 50% of fluorine contained in the raw material phosphate rock is present as hydrofluoric acid and hydrofluosilicic acid dissolved in the produced phosphoric acid and wet process phosphoric acid contains usually about 2 to 3% fluorine compounds as F.

Therefore, in the case of using wet process phosphoric acid as a raw material for producing industrial chemicals, it is necessary to remove these fluorine compounds together with sulfates and other metallic impurities contained in the wet process phosphoric acid. There are already known many methods for purifying wet process phosphoric acid. The conventional method for removing fluorine compounds in wet process phosphoric acid is a process wherein sodium silicate, sodium hydroxide or sodium carbonate is added to wet process phosphoric acid to precipitate fluorine compounds as insoluble sodium silicofluoride and the resulting precipitate is removed. However, the recovered sodium silicofluoride has admixed therewith large amounts of various metallic impurities derived from the phosphate rock and other impurities such as gypsum.

An object of the present invention is to provide a method for producing sodium silicofluoride of high purity from wet process phosphoric acid.

Another object of the present invention is to provide a method for removing fluorine compounds as sodium silicofluoride of high purity in order to purify wet process phosphoric acid.

According to the present invention a method for producing sodium silicofluoride from wet process phosphoric acid containing hydrofluosilicic acid comprises adding a sodium salt to wet process phosphoric acid in the presence of a sodium fluoride, sodium bifluoride or a mixture thereof.

S. Atkin et al. have disclosed in Ind. Eng. Chem., 53, 705–707 (1961) a method for economically recovering sodium silicofluoride of high purity from wet process phosphoric acid containing 32% by weight $P_2O_5$ by carefully adjusting crystallizing conditions such as temperature, addition of a defoaming agent and the amount of excess alkali. As a result of making many experiments with a view to producing high purity sodium silicofluoride according to the method of S. Atkin et al., it has been discovered that the sodium silicofluoride obtained by the addition of an alkali under the same conditions is not always of the industrially required quality due to various factors such as operating conditions while producing the wet process phosphoric acid and the type and heat treatment of the raw material phosphate rock. That is to say, wet process phosphoric acid has been produced under various operating conditions from several kinds of phosphate rock different in origin and heat treatment. The obtained phosphoric acid was left standing for more than 12 hours, was then warmed so that such impurities present as calcium sulfate dissolved in the acid might not be deposited and was neutralized with sodium carbonate by varying the ratio of the sodium carbonate to the hydrofluosilicic acid contained in the acid. The precipitated crystals of sodium silicofluoride were separated by filtration, washed with water and then dried to obtain crystals of sodium silicofluoride.

As a result of chemical analysis of the thus obtained sodium silicofluoride, it has been discovered that the purity of sodium silicofluoride is little influenced by the rate of addition of sodium carbonate to hydrofluosilicic acid contained in phosphoric acid and that, when phosphoric acid obtained, for example, from calcined Morocco phosphate rock is used, irrespective of the operating conditions for producing the sodium silicofluoride such as temperature and rate of addition of sodium carbonate to hydrofluosilicic acid, the purity is about 95% and no high quality sodium silicofluoride is obtained. As a result of investigating these results, it has been also discovered that coprecipitation of fine silicic acid together with the crystals of sodium silicofluoride is a main cause.

The fact that, when phosphoric acid containing hydrofluosilicic acid and another silicon compound in substantially the same amount is used, the purity of the produced sodium silicofluoride is remarkably influenced by various conditions such as operating conditions for producing phosphoric acid and the type and heat treatment of the raw material phosphate rock is thought to be probably due to the differences in physical and chemical properties of the silicon compound contained in the phosphate rock.

The reduction of purity of the product by coprecipitation of silicic acid can be avoided by adding sodium fluoride, sodium bifluoride or a mixture thereof to the wet process phosphoric acid.

The amount of addition of the fluoride is preferably less than about 10 gr. per liter of wet process phosphoric acid containing 15 to 45% by weight $P_2O_5$ and 1 to 5% by weight hydrofluosilicic acid. The amount of 3 to 7 gr. of the fluoride per liter of phosphoric acid is specifically preferable. For example, when phosphoric acid obtained from calcined Morocco phosphate rock and containing 1.59% by weight $SiO_2$ and 1.93% by weight fluorine was used, the purity of sodium silicofluoride obtained without the addition of sodium fluoride was only 94.2% and its aqueous solution was of a white-turbid color with a fine precipitate of silicic acid floating therein. On the other hand, when 2 gr./l. of sodium fluoride were added, sodium silicofluoride of a purity of 98.8% was obtained. When 6 gr./l. of sodium fluoride were added, there was obtained sodium silicofluoride of a purity of 99.8% in which no white-turbidity was seen. Thus, when a small amount of less than about 10 gr./l. of sodium fluoride is added, a very favorable result is obtained. Even when a larger amount of more than about 10 gr./l. is used, no further improvement can be expected.

The sodium fluoride or sodium bifluoride to be used in the method of the present invention need not be a powdery product but may be a solution or a slurry and may be a mixture of sodium fluoride with acid sodium fluoride or hydrofluoric acid. When sodium fluoride is used, a part of the produced sodium silicofluoride is reacted with sodium carbonate or sodium hydroxide according to a conventional method and the resulting sodium fluoride is used in the method of the present invention.

For the sodium salt is used sodium carbonate, sodium phosphate, sodium chloride, sodium sulfate or sodium hydroxide. It is preferable to add the sodium salt in an amount ranging from 0.5 to 3 times the stoichiometrical amount necessary to form sodium silicofluoride.

In wet process phosphoric acid, organic impurities contained in phosphate rock are present as tary or colloidal substances. These substances cause reduction of purity of the obtained sodium silicofluoride and therefore should preferably be removed prior to producing the sodium silicofluoride. However, these substances are in a form which is very difficult to separate by filtration as such. Therefore, it is necessary to use a filter aid. For the filter aid, fine crystals of calcium sulfate obtained by hydrating gypsum semihydrate in water or in an aqueous solution of less than 30% by weight phosphoric acid can be advantageously used. It is preferable that the crystals of calcium sulfate are of less than $75\mu$ or specifically 10 to $40\mu$. The gypsum semihydrate need not be perfectly hydrated to gypsum dihydrate but a considerable amount of gypsum semihydrate may be present. When wet process phosphoric acid from which organic impurities have been previously removed is used, the color of the obtained sodium silicofluoride is further improved.

According to the present invention, sodium silicofluoride of high quality can be produced from wet process phosphoric acid irrespective of the operating conditions for producing the phosphoric acid and the type and heat treatment of the raw material phosphate rock.

In the following examples percentages are by weight.

EXAMPLE 1

700 ml. of wet process phosphoric acid obtained from calcined Morocco phosphate rock, left standing overnight to remove the precipitate and containing 28.7% $P_2O_5$ and such impurities as 1.93% F, 1.59% $SiO_2$, 2.16% $SO_3$, 0.22% $Fe_2O_3$ and 0.17% $Al_2O_3$ were put into each of 4 polyethylene vessels of a capacity of 1.5 liters. Each vessel was fitted with a stirrer and was heated in a water bath with stirring until the temperature of the phosphoric acid reached 55 to 65° C. Then 10.5 gr. of sodium carbonate were added to each vessel within about 5 minutes. At the same time, sodium fluoride was added in an amount of 1 gr. to the vessel A, 2 gr. to vessel B and 5 gr. to vessel C and was reacted while keeping the same temperature for 2 hours. To vessel D was added only sodium carbonate but no sodium fluoride. After completion of the reaction, the precipitate was separated while hot by suction filtration using a Buechner funnel, was again made a slurry with a sufficiently large amount of water, was washed and then filtered and was dried at a temperature of 105° C. for 3 hours. The dried products were chemically analyzed by a fixed method. As a result, the purities of products obtained in the vessels A, B and C by the method of the present invention were found to be respectively 96.9, 99.2 and 100% but that of the product obtained in vessel D for comparison was found to be 93.9%. When 0.5 gr. of each product was added to 100 ml. of water and was stirred and the appearance of the resulting aqueous solution was examined, sample D was found to be remarkably white-turbid and samples A and B were seen to be somewhat white-turbid but no white-turbidity was seen in sample C.

EXAMPLE 2

56 gr. of sodium silicofluoride and 240 gr. of a solution of 30% sodium hydroxide were placed in a vessel of a capacity of 500 ml. and were stirred to react at a temperature of 80° C. for about 30 minutes. After completion of the reaction, the reaction mixture was left standing for about 30 minutes to precipitate sodium fluoride. The supernatant liquid was separated and the sodium fluoride was washed with water and then filtered to obtain 93 g. of wet crystalline sodium fluoride of a water content of 25%.

The same vessel made of polyethylene as was used in Example 1 was charged with 700 ml. of wet process phosphoric acid obtained from Togo phosphate rock and containing 29.8% $P_2O_5$ and impurities such as 2.6% $SO_3$, 2.4% F and 1.7% $SiO_2$ and was heated on a water bath to a temperature of about 60° C. 17.5 gr. of sodium carbonate and 6.5 gr. of the above described wet sodium fluoride were then added thereto to react while keeping the same temperature for 2 hours. After completion of the reaction, the reaction product was filtered under suction with a filter made of porcelain, the cakes were again made a slurry and the slurry was water-washed and then filtered and was dried at 105° C. for 3 hours. The purity of the dried product was 99.8% and the appearance of its aqueous solution was favorable. The purity of sodium silicofluoride obtained from the same phosphoric acid without adding sodium fluoride was 98.1%.

EXAMPLE 3

700 ml. of the same wet process phosphoric acid as was used in Example 1 were placed in a polyethylene vessel of a capacity of 1.5 liters and were heated to about 65° C. Then 15 gr. of sodium carbonate and 4 gr. of sodium bifluoride were added thereto to react while keeping the same temperature and with stirring for about 2 hours.

Then, by the same treatment as in Example 1, sodium silicofluoride of a purity of 99.8% was obtained.

EXAMPLE 4

100 ml. of phosphoric acid of a concentration of 10% $P_2O_5$ were placed in a beaker of a capacity of 300 ml. and were warmed to 40° C. Gypsum semihydrate was added thereto with stirring to prepare a slurry of a weight ratio of gypsum semihydrate/phosphoric acid of about 2/10. After the gypsum semihydrate was added, at 10 minute intervals, a small amount of the slurry was removed and the variation of the crystalline form of the produced gypsum was observed with a microscope. After the gypsum semihydrate was added, in 20 minutes, the slurry began to produce fine dihydrate crystals and, in 40 minutes, transparent plate crystals of gypsum dihydrate were shown to have been well completed. Even after 2 hours, the fine crystals did not grow and the crystals were so fine as to be of 10 to $40\mu$. 15 ml. of this gypsum dihydrate slurry were added to 1 liter of the same wet process phosphoric acid as was used in Example 2 and the mixture was filtered. The amount of organic impurities in the obtained phosphoric acid was 0.02%. By comparison, the amount of organic impurities in the phosphoric acid before the filtration was 0.4%. When the obtained phosphoric acid was treated in the same manner as in Example 2, there was obtained sodium silicofluoride of a purity of 99.8%. The color of the sodium fluorosilicate was better than when the wet process phosphoric acid was not filtered.

What is claimed is:

1. A method for producing sodium silicofluoride of high purity from wet process phosphoric acid containing hydrofluosilicic acid which comprises adding to said wet process phosphoric acid a sodium compound selected from the group consisting of sodium carbonate, sodium hydroxide, sodium chloride, sodium sulfate and sodium phosphate in the presence of a fluoride selected from the group consisting of sodium fluoride, sodium bifluoride and a mixture thereof to form sodium silicofluoride.

2. The method according to claim 1 wherein the wet process phosphoric acid contains 15 to 45 weight percent $P_2O_5$ and 1 to 5 weight percent hydrofluosilicic acid and wherein the amount of fluoride present is less than 10 grams per liter of said wet process phosphoric acid.

3. The method according to claim 1 wherein said wet process phosphoric acid, prior to the addition of said sodium compound, is filtered to remove organic impurities therefrom with calcium sulfate crystals formed by hydrating gypsum semihydrate in a medium selected from the group consisting of water and phosphoric acid.

4. A method for producing sodium silicofluoride of high purity from wet process phosphoric acid containing 15 to 45 weight percent $P_2O_5$ and 1 to 5 weight percent hydrofluosilicic acid which comprises filtering said wet process phosphoric acid to remove organic impurities therefrom with calcium sulfate crystals formed by hydrating calcium sulfate semihydrate in a medium selected from the group consisting of water and phosphoric acid, and adding to said filtered wet process phosphoric acid a sodium compound selected from the group consisting of sodium carbonate, sodium hydroxide, sodium chloride, sodium sulfate and sodium phosphate in the presence of a fluoride in an amount less than 10 grams per liter of said wet process phosphoric acid to form sodium silicofluoride, said fluoride being selected from the group consisting of sodium fluoride, sodium bifluoride and a mixture thereof.

References Cited

UNITED STATES PATENTS

| | | | |
|---|---|---|---|
| 2,588,786 | 3/1952 | Winter | 23—88 XR |
| 2,790,705 | 4/1957 | Kean et al. | 23—88 |
| 2,883,266 | 4/1959 | Hodges et al. | 23—88 |
| 3,055,733 | 9/1962 | Lang et al. | 23—88 |
| 3,107,145 | 10/1963 | Hinkle et al. | 23—88 XR |
| 3,258,308 | 6/1966 | Peterson et al. | 23—88 |
| 3,296,124 | 1/1967 | Heins | 23—88 XR |

OTHER REFERENCES

Industrial and Engineering Chemistry, vol. 53, No. 9, September 1961, pp. 705–707.

EDWARD STERN, Primary Examiner

U.S. Cl. X.R.

23—122